Figure 1:
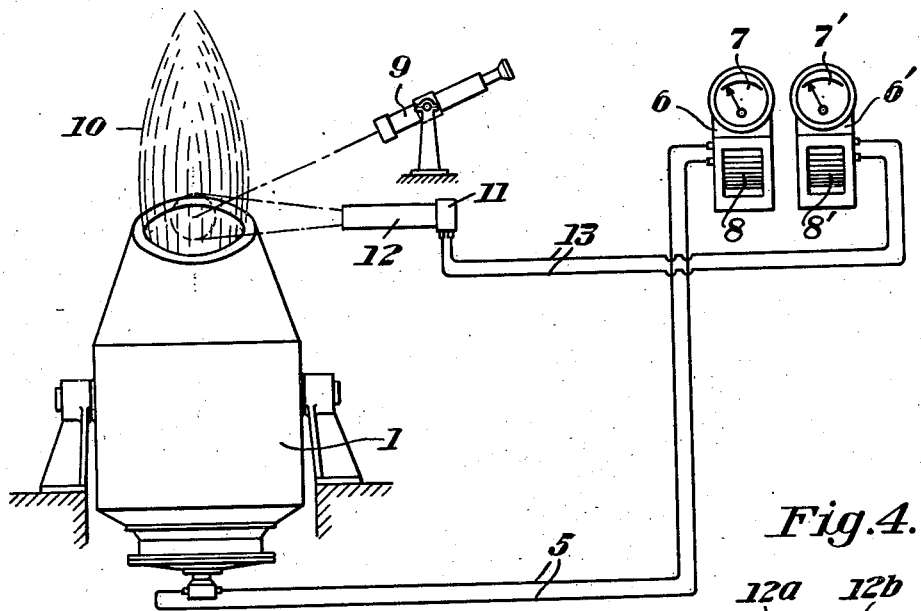

July 25, 1944.  J. W. PERCY  2,354,400
BESSEMER CONVERTER BLOW CONTROL METHOD
Filed June 22, 1942   2 Sheets-Sheet 1

Inventor:
JAMES WARD PERCY,
by: John E. Jackson
his Attorney.

July 25, 1944.  J. W. PERCY  2,354,400
BESSEMER CONVERTER BLOW CONTROL METHOD
Filed June 22, 1942   2 Sheets-Sheet 2

Inventor:
JAMES WARD PERCY,
by: John E. Jackson
his Attorney.

Patented July 25, 1944

2,354,400

UNITED STATES PATENT OFFICE 2,354,400

BESSEMER CONVERTER BLOW CONTROL METHOD

James Ward Percy, Jersey City, N. J., assignor to United States Steel Corporation of Delaware, a corporation of Delaware Application June 22, 1942, Serial No. 448,015

9 Claims. (Cl. 75—60)

This invention is a Bessemer converter blow controlling method, the object being to control a blow so as to surely obtain metal having predetermined properties. Since the introduction of the Bessemer converter, attainment of this object has been attempted by blow controlling methods comprising measuring the radiation from the flame produced by the converter during the blow, and controlling the blow to adjust this radiation to predetermined measurements; because it has heretofore been thought that the flame radiation measurements provide a true index to the reactions proceeding in the metal being refined. These methods have failed to permit complete attainment of the object mentioned.

It has always been usual to measure the flame radiation by eye, the blower customarily observing the flame through colored glasses and controlling the blow according to the dictates of his experience, this practice sometimes failing to produce metal having the desired properties. Therefore, early in the last half of the 19th century, the blower was provided with a spectroscope having a screen on which the flame radiation bright line spectrum was projected beside a comparison spectrum. In recognition of the fact that this instrument could not permit measuring of the invisible flame radiation, a spectroscopic camera was also used during this period, the photographic plates used being sensitized to both the visible and invisible wave lengths, and the camera being arranged so that a succession of exposures could be made during a blow, and so that the plates could be quickly developed and fixed inside the camera and extracted for viewing, this equipment enabling the blower to obtain a permanent record of the flame radiation measurements during a blow, including both the visible and invisible wave lengths. Another expedient of this early period was the provision of a special flame viewing filter accompanied by a plate consisting of about 100 varieties of colors and tints all of which were numbered, and thus referred to a table which indicated their compositions, the colors being arranged to be seen with either a light or dark colored background. However, none of these flame radiation measuring methods using instruments, have permitted the production of metal having predetermined properties, with sufficient precision to warrant their permanent substitution for the simpler, direct visual measuring method.

Failure to attain the desired object by the substitution of flame radiation measuring instruments for the eye, has been attributable to the inability of those skilled in the art of photometry to provide adequately precise and rugged instruments; so when the automatic, recording, photo-cell photometer was developed to a point where it met these requirements, it was natural to apply it to the Bessemer blow controlling art. This has been done by positioning the photocell where the radiation from the Bessemer flame can affect it, the automatic, recording potentiometer associated with this photo-cell, being placed where the blower can conveniently study the recording of the flame radiation measurements as they are obtained during a blow. However, here again, it has been impossible to produce metal having predetermined properties, with sufficient precision to warrant the substitution of this instrument for the direct visual measuring method. Although this instrument operates exactly as it does in all of its many other radiation measuring applications, to accurately measure and record the radiation affecting its photo-cell, and although the blower controls a blow to duplicate measurements previously determined as once producing metal having the desired properties, it is necessary for the blower to continue the blow after the instrument has shown attainment of the end point, for a further time interval which must be varied according to the blower's experience, to attain the metal properties aimed for. Since the human element is thus involved, the precision involved is no greater than when the blower resorts to the usual direct visual flame radiation method. It follows that blow controlling methods relying solely on flame radiation measurement, are unsuccessful in surely producing metal having predetermined properties.

Keeping the foregoing in mind, the present invention diverges widely from this prior art in that it is a Bessemer converter blow controlling method comprising measuring the radiation from the metal in the converter during the blow, and controlling the blow to adjust this radiation to a predetermined measurement. More specifically, the metal radiation is measured as the end point is approached, and the blow then controlled to adjust the metal radiation to a predetermined measurement at the end point, the latter being determined by any practical flame radiation measuring method, and the blow being ended at a predetemined time after the end point. The predetermined metal radiation measurement is initially determined by test blows, the measurement obtained in the case of the test blow producing metal having the desired properties, being the measurement used thereafter to control the converter involved. The duration of the time interval between the end point and the end of the blow is also predetermined in this manner, and it need not be varied thereafter. Greater precision is attained by obtaining a plurality of measurements during test blows until the end points are reached, and then controlling the duplicating blows so that the metal radiation measurements follow the pattern of measurements obtained in the case of the successful test blow, the measurements being taken during similar intervals, which are thus predetermined, up to the end points, and the blows being ended at similar times thereafter, this practice with certainty producing metal having the same properties in each instance. It is to be understood, of course, that the charges and blowing conditions are known, and that the charges are standardized.

During the test blows, the flame radiation characteristics may be measured as well as the metal radiation, the duplicating blows then being controlled so that the metal radiation measurements are similar to those of the successful test blow, at the same time similar changes occur in the flame radiation characteristics as occurred during the blow being duplicated, until the end points are attained. In other words, this practice consists in controlling the duplicating blows so that the metal radiation measurements closely follow the pattern of those measurements obtained in the case of the successful test blow, while simultaneously causing the flame radiation to generally follow the pattern of the flame radiation measurements of this test blow, until they indicate that the end point is reached, the blow being ended after the time interval used in the case of the test blow. In such instances, the flame radiation measurements to be considered are those of its characteristics or wave lengths, since these values are independent of the flame temperature, it having been found that there is no direct measurable relation between the flame temperature and the metal reactions. This means that the flame radiation measurement pattern obtained by the recorder of the automatic, photo-cell photometer need not be exactly followed since it normally represents both flame radiation intensity and characteristics, such a pattern being of value, mainly, because it indicates, by its shape, the approach of the end point as well as the end point. Similar results are obtained by the use of a spectroscope; and the direct visual flame radiation measurement method is entirely practical when the metal radiation measurements are made to follow those of a successful test blow. However, the automatic, photo-cell photometer has its usual advantage of convenience and of providing a record, as well as its ability to function as a spectrophotometer by the use of filters or by application to a spectroscope.

The present invention also involves a new technique for measuring the flame radiation with instruments such as the spectroscope and, particularly, the automatic, photo-cell photometer. This technique consists, broadly, in restricting the radiation measured, to that directly emanating from the converter flame; as contrasted, for instance, to the prior art practice of positioning a photo-cell so that it receives both direct and reflected flame radiation and radiation from all lighted objects in the general vicinity of the converter. According to the invention, this is done by providing the photo-cell with a sighting tube provided with a lens for focusing only the direct flame radiation onto the cell, this tube preferably being provided with a system of diaphragms for more positively excluding other than the direct flame radiation. Best results are secured by sighting the tube at a centrally localized portion of the converter flame adjacent its base at the mouth of the converter, the lens and diaphragm arrangement being such that the photo-cell receives radiation only from this localized portion of the flame.

If a spectroscope is used, the same practice may be followed by focusing its telescope so the field of this instrument includes only the mentioned portion of the flame. However, the spectroscope is not so apt to introduce errors when it is used in other manners, as is the automatic, photo-cell photometer, this phase of the invention being particularly useful in connection with the latter instrument. As heretofore used, the automatic recording, photo-cell photometer has had a decided tendency to provide a record that is not truly representative of the flame radiation changes, this being particularly objectionable when this instrument is used to indicate the approach and attainment of the end point in conjunction with the metal radiation measuring practice heretofore described, since it interferes with the fine precision otherwise obtainable.

Figure 4:
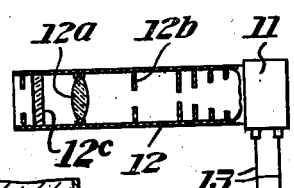
Figure 2:
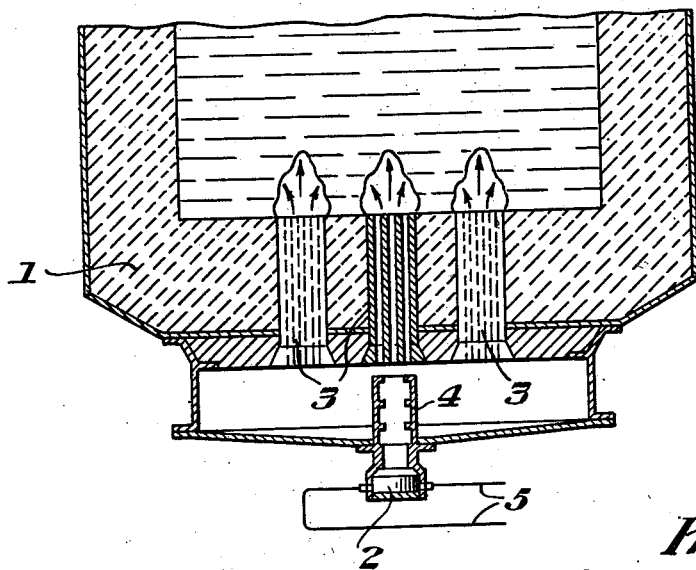
Figure 3:
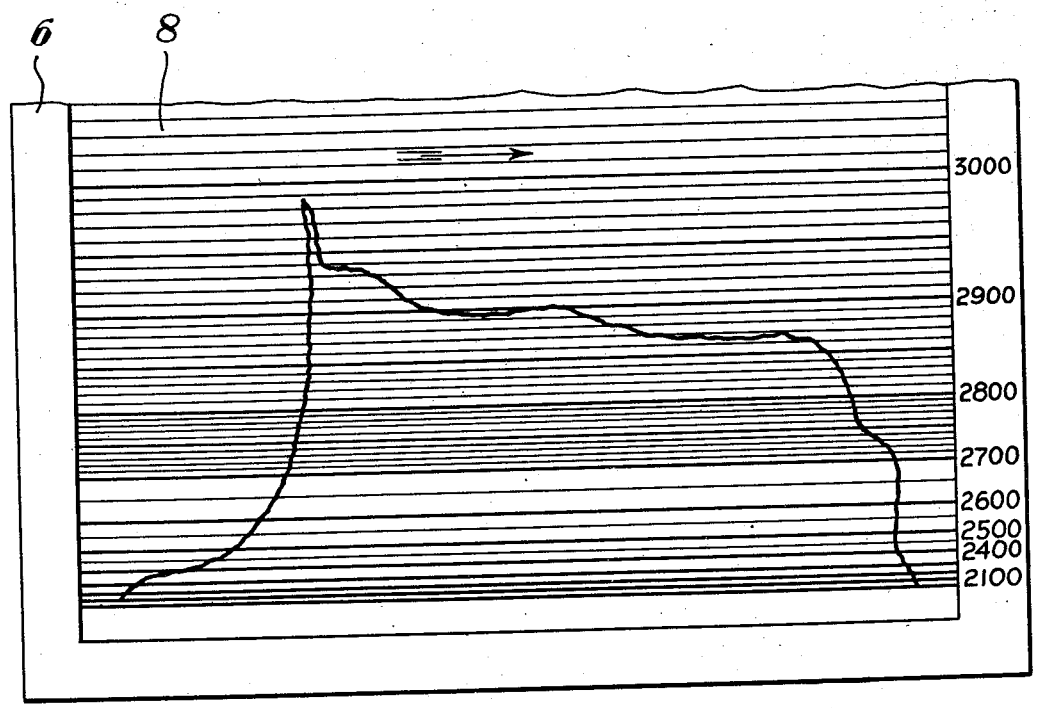

The accompanying drawings illustrate equipment for carrying out this invention, Figure 1 schematically illustrating the assembled equipment; Figure 2 showing a vertical section of the bottom of the converter shown in Figure 1; and Figure 3 showing a characteristic recording of the metal radiation, and Figure 4 showing in section a detail of Figure 1.

More specifically, these drawings show a Bessemer converter 1 with a photo-cell 2 sealed airtight in the wind chest of this converter, and sighted, through a hole of one of the tuyères 3, directly at the metal of the converter, a sighting tube 4 shielding the photo-cell from reflected radiations in the interest of obtaining accurate readings. An electric circuit 5 connects the photo-cell 2 to a commercial, automatic, indicating and recording potentiometer 6, the dial of which is shown at 7 and the recording strip at 8. To avoid confusion, the necessary amplifier is not shown. This arrangement permits measuring of the converter metal radiation, it being considered preferable to calibrate the potentiometer 6 with the photo-cell 2, so that the potentiometer readings are obtained in terms of the metal temperature. Other devices capable of responding to the metal radiation may be substituted for the photo-cell 2, providing the device used is such that it permits measuring of the metal radiation.

A spectroscope 9 has its telescope sighted on the converter flame 10, this being done so that the flame radiation measured is restricted to a centrally localized portion at the base of the flame adjacent the converter mouth. Alternatively, an automatic, photo-cell photometer may be used, this being shown in the form of a photo-cell 11 provided with a telescope 12 having a lens 12a and a diaphragm system 12b, which restrict the radiation falling on the photo-cell 11 to that emanating from a centrally localized portion of the base of the flame adjacent the converter mouth, the included portion being indicated by broken lines. Preferably, an absorption filter 12c is included to limit the radiation to those wave lengths found to accent the response of the photo-cell. The photo-cell 11 is connected by an electric circuit 13 to another automatic, indicating and recording potentiometer 6' having an indicating dial 7' and a recording strip 8'. Here again the amplifier is omitted.

In using this apparatus, according to the invention, the converter 1 is charged with metal of known composition and amount, and is then blown with a blast of known pressure and humidity, a series of blows being carried out in this fashion until metal of the desired properties is obtained, the blower controlling the blow according to the dictates of his experience at this time. During each blow the potentiometers 6 and 6', respectively, indicate and automatically record continuously, both the metal and flame radiation measurements. If the spectroscope 9 is used, the blower obtains the flame radiation measurements by means of this instrument, it showing the approach of the end point by flickering of certain characteristic bright lines or bands which completely disappear when the end point is reached. During each blow, the time interval between the attainment of the end point and the end of the blow is noted by the blower, it being understood that this time interval is largely made necessary by the time required to turn down the converter so as to permit the ending of the blow, rather than to finish the blow as has heretofore been necessary.

Upon producing metal having the desired properties, the blower can reproduce this metal as many times as desired, by using the same conditions, and by controlling successive blows so that the metal radiation measurements, as recorded on the strip 8, follow the same course and are substantially the same as the end points are approached. As previously explained, the approach and attainment of the end point may be determined by measuring the flame radiation in any practical manner, satisfactory precision being obtained by direct visual measuring, although the use of an instrument for this purpose is preferable since it aids in eliminating the human factor. In case the automatic, recording, photo-cell photometer is used to measure and record the flame radiation, the blower controls the blow so that the metal radiation measurements recorded on the strip 8 closely follow the pattern of measurements obtained at the time of the successful test blow, while the flame radiation measurements are made to follow, as closely as possible, the pattern of measurements obtained during the test blow.

In all events, each blow is ended at a predetermined time after the end point is reached, this time being that which prevailed in the case of the successful test blow. The time period between the end point and the end of the blow is definitely fixed, as contrasted to being indefinite and depending on the blower's experience. It is to be understood that the potentiometer 6 and the spectroscope 9 should be positioned convenient to the blower, this applying to the potentiometer 6' in case it is substituted for the spectroscope 9. Figure 3 illustrates a typical recording of the metal radiation measurements when the potentiometer strip 8 records these measurements in terms of temperature. When the charging practice is standardized, metal of the same properties is repeatedly produced by successive blows when the blower controls each blow so that the metal temperature, as indicated on the strip 8, follows the same pattern of measurements throughout each blow, and the blows are ended at similar times after attainment of the end points. It is to be understood that when the blower causes the temperature of the metal to vary in the same manner each time, and to have the same value at the end points, that he can follow the customary practice of determining the approach and attainment of the end points by direct visual examination of the flame, and still produce metal having more similar properties in each instance, than is possible by any prior art method discussed herein. This follows from the fact that the flame radiation is measured as to its characteristics rather than its intensity, the eye being able to detect changes in the flame characteristics with considerable accuracy. The automatic, photo-cell photometer can be used for this purpose because it measures both the flame characteristics and intensity, whereby the general pattern of the measurements obtained with this instrument provides a general indication of the changes in the flame radiation characteristics even though having no direct relation to the reactions proceeding in the metal in the converter. It is for this reason that the blower cannot control a blow to simultaneously reproduce the measurement patterns obtained on both the strips 8 and 8' during successive blows, but must, instead, reproduce the pattern on the strip 8 measuring the metal radiation, while approximating the pattern on the strips 8', so that the metal temperature follows the metal temperature of the blow being reproduced, when the same flame characteristic changes occur.

I claim:

1. A Bessemer converter blow controlling method comprising measuring the radiation from the metal in the converter during the blow, and controlling the blow to adjust said radiation to a predetermined measurement.

2. A Bessemer converter blow controlling method comprising measuring the radiation from the metal in the converter during the blow, as the end point is approached, and controlling the blow to adjust said radiation to a predetermined measurement at the end point.

3. A Bessemer converter blow controlling method comprising measuring the radiation from the metal in the converter during the blow, and controlling the blow to cause the measurements of said radiation to follow a predetermined pattern of measurements, until the end point is reached.

4. A Bessemer converter blow controlling method comprising measuring the radiation from the metal in the converter during the blow, and controlling the blow to cause the measurements of said radiation to follow a predetermined pattern of measurements, until the end point is reached, the blow being ended at a predetermined time after the end point.

5. A Bessemer converter blow controlling method comprising measuring the radiation from the metal in the converter during the blow, and controlling the blow to adjust said radiation to predetermined measurements at predetermined intervals during the blow.

6. A Bessemer converter blow controlling method comprising measuring the radiation solely from the converter flame during the blow, measuring the radiation from the metal in the converter during the blow, and controlling the blow to adjust the metal radiation to a predetermined measurement when the flame radiation acquires a predetermined measurement.

7. A Bessemer converter blow controlling method comprising measuring the radiation solely from the converter flame during the blow, measuring the radiation from the metal in the converter during the blow, and controlling the blow to adjust the metal radiation to a predetermined measurement when the flame radiation acquires a predetermined measurement, the flame radiation measured being restricted to that from a localized portion of the flame adjacent its base.

8. A Bessemer converter blow controlling method comprising measuring the radiation from the converter flame during the blow, measuring the radiation from the metal in the converter during the blow, and controlling the blow to cause the measurements of the metal radiation to follow a predetermined pattern of measurements, and to, simultaneously, cause the flame radiation to at least approximately follow a predetermined pattern of measurements, until the flame radiation measurements show that the end point is reached, the blow being ended a predetermined time thereafter.

9. A Bessemer converter blow controlling method comprising measuring the characteristics of the radiation from the converter flame during the blow, measuring the intensity of the radiation from the metal in the converter during the blow, and controlling the blow to cause the metal radiation intensity to follow a predetermined pattern of intensity measurements, and to, simultaneously, cause the flame radiation to at least approximately follow a predetermined pattern of characteristics measurements, until the flame radiation characteristics measurements show that the end point is reached, the blow being ended a predetermined time thereafter.

JAMES WARD PERCY.